United States Patent
Merzhaeuser et al.

(10) Patent No.: US 10,451,031 B2
(45) Date of Patent: Oct. 22, 2019

(54) WIND TURBINE ROTOR BLADE

(71) Applicant: General Electric Company, Schenectady, NY (US)

(72) Inventors: Thomas Merzhaeuser, Munich (DE); Sara Simonne Louisa Delport, Munich (DE)

(73) Assignee: General Electric Company, Schenectady, NY (US)

(*) Notice: Subject to any disclaimer, the term of this patent is extended or adjusted under 35 U.S.C. 154(b) by 402 days.

(21) Appl. No.: 15/185,345

(22) Filed: Jun. 17, 2016

(65) Prior Publication Data

US 2017/0363062 A1 Dec. 21, 2017

(51) Int. Cl.
*F03D 1/06* (2006.01)
*F03D 13/20* (2016.01)
*F03D 80/00* (2016.01)

(52) U.S. Cl.
CPC ......... *F03D 1/0675* (2013.01); *F03D 1/0633* (2013.01); *F03D 1/0691* (2013.01); *F03D 13/20* (2016.05); *F03D 80/00* (2016.05); *F05B 2220/30* (2013.01); *F05B 2240/21* (2013.01); *F05B 2240/302* (2013.01); *F05B 2260/3011* (2013.01); *F05B 2270/33* (2013.01)

(58) Field of Classification Search
CPC .... F03D 1/0675; F03D 1/0633; F03D 1/0683; F03D 1/0691; F03D 13/20; F03D 80/00; F05B 2270/33; F05B 2240/302; F05B 2240/21; F05D 2220/30; F05D 2260/3011
See application file for complete search history.

(56) References Cited

U.S. PATENT DOCUMENTS

| | | | |
|---|---|---|---|
| 4,137,007 A | 1/1979 | Schonball | |
| 4,813,199 A * | 3/1989 | Lewis, Jr. | E01F 9/635 403/2 |
| 6,428,269 B1 | 8/2002 | Boratgis et al. | |
| 6,582,196 B1 | 6/2003 | Andersen et al. | |
| 7,246,991 B2 | 7/2007 | Bosche | |
| 8,131,402 B2 | 3/2012 | Neumann | |

(Continued)

FOREIGN PATENT DOCUMENTS

| | | |
|---|---|---|
| CN | 102182648 A | 9/2011 |
| CN | 102269117 A | 12/2011 |

(Continued)

OTHER PUBLICATIONS

Hirakata Hirakata JP 2006336513—English machine translation.*

(Continued)

*Primary Examiner* — Igor Kershteyn
(74) *Attorney, Agent, or Firm* — Mary Louise Stanford (57) ABSTRACT

A rotor blade for addressing the deflection of rotor blades of a wind turbine. The rotor blade includes a plurality of exterior surfaces defining a blade body having a pressure side, a suction side, a leading edge and a trailing edge. The blade body extending between a blade tip and a blade root. The blade body including a breakaway tip portion defined by a predetermined breaking point. The breakaway tip portion is configured to break away from the remaining portion of the blade body when subject to a predetermined tower strike load. A wind turbine including the rotor blade configuration is further disclosed.

22 Claims, 7 Drawing Sheets

(56) References Cited

U.S. PATENT DOCUMENTS

| | | | |
|---|---|---|---|
| 8,882,466 B2* | 11/2014 | Stiesdal | F03D 1/065 |
| | | | 416/146 R |
| 2006/0083907 A1* | 4/2006 | Bech | B29C 66/1162 |
| | | | 428/212 |
| 2011/0135466 A1 | 6/2011 | Latorre et al. | |
| 2012/0141287 A1 | 6/2012 | Hynum et al. | |
| 2013/0045098 A1 | 2/2013 | Taylor | |
| 2013/0287567 A1 | 10/2013 | Olesen et al. | |
| 2014/0056715 A1* | 2/2014 | Vossler | B29C 33/308 |
| | | | 416/241 R |
| 2015/0147172 A1 | 5/2015 | Chacon | |
| 2016/0108736 A1* | 4/2016 | Schuring | F03D 1/0675 |
| | | | 416/226 |
| 2017/0058861 A1* | 3/2017 | Tobin | F03D 1/0675 |
| 2017/0058862 A1* | 3/2017 | Caruso | F03D 1/0675 |

FOREIGN PATENT DOCUMENTS

| | | |
|---|---|---|
| GB | 2485595 A | 5/2012 |
| JP | 2006-336513 A | 12/2006 |
| JP | 2006336513 A * | 12/2006 |
| WO | 2007054098 A1 | 5/2007 |

OTHER PUBLICATIONS

X Fu et al., "MEMS gyroscope sensors for wind turbine blade tip deflection measurement", 2013 IEEE International Instrumentation and Measurement Technology Conference (I2MTC), pp. 1708-1712, May 6-9, 2013, Minneapolis, MN.

Lihan He et al., "Camera-based portable system for wind turbine blade tip clearance measurement", Imaging Systems and Techniques (IST), 2013 IEEE International Conference on, pp. 451-456, Oct. 22-23, 2013, Beijing.

Thomas Merzhaeuser et al., "Rotor Blade Tip Mold Assembly Including Solid Core and Method for Forming Rotor Blade Tip", PCT Patent Application No. PCT/US2016/02445., pp. 1-42.

Thomas Merzhaeuser et al., "Rotor Blade Tip Mold Assembly Including Expandable Bladders and Method for Forming Rotor Blade Tip", PCT Patent Application No. PCT/US2016/02447, pp. 1-43.

International Search Report and Written Opinion issued in connection with corresponding PCT Application No. PCT/US2017/37944 dated Sep. 12, 2017.

\* cited by examiner

WIND TURBINE ROTOR BLADE

BACKGROUND

The present subject matter relates generally to wind turbines and particularly to rotor blade deflection. More particularly, the present subject matter relates to a rotor blade configured to address rotor blade deflection during operation of a wind turbine.

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, deflection of a rotor blade is a function of blade length, along with wind speed, turbine operating states and blade stiffness. Thus, longer rotor blades may be subject to increased deflection forces, particularly when a wind turbine is operating in high-speed wind conditions. These increased deflection forces not only produce fatigue on the rotor blades and other wind turbine components but may also increase the risk of the rotor blades striking the tower. A tower strike can significantly damage a rotor blade and the tower and, in some instances, can even bring down the entire wind turbine. Accordingly, a tower strike may result in considerable downtime to repair or replace damaged components.

Known wind turbine systems commonly determine rotor blade deflection by utilizing external sensors, which are typically mounted on the rotor blades or on the tower. These sensors are designed to sense rotor blade operating conditions (e.g. blade strain, blade acceleration or blade velocity) to enable blade deflection to be inferred or calculated. In other instances, the sensors are designed to sense the distance of the rotor blade from the tower during operation. Action may be taken as a result of the sensed data to minimize the risk of the rotor blade impacting the tower. However, maintaining the sensors can be very costly and calibrating such sensors can be quite complex and time consuming. Moreover, since the sensors must be calibrated frequently, there is a concern with regard to the reliability of data transmitted from the sensors over an extended period of time.

Accordingly, there is a need for a means to address wind rotor blade deflection without the excessive complexity and costs of calculating deflection during operation.

BRIEF DESCRIPTION

These and other shortcomings of the prior art are addressed by the present disclosure, which includes a wind turbine rotor blade including a breakaway tip portion.

Briefly, one aspect of the present disclosure resides in a rotor blade of a wind turbine. The rotor blade including a plurality of exterior surfaces defining a blade body having a pressure side, a suction side, a leading edge and a trailing edge. The blade body extending between a blade tip and a blade root. The rotor blade defining a span and a chord. The blade body including a breakaway tip portion defined by a predetermined breaking point, wherein the breakaway tip portion is configured to break away from the remaining portion of the blade body when subject to a predetermined tower strike load.

Another aspect of the disclosure resides in a wind turbine. The wind turbine including a plurality of rotor blade assemblies. At least one of the rotor blade assemblies including a suction side surface and a pressure side surface, and defining a span and a chord. The suction side surface and the pressure side surface defining a blade body extending between a blade tip and a blade root. The blade body including a predetermined breaking point, defined by a reduced strength margin in the blade body, at which a breakaway tip portion may break away from a bulk of the blade body under a predetermined load condition.

Yet another aspect of the disclosure resides in a wind turbine. The wind turbine including a tower; a hub; and at least one rotor blade rotatably connected to the hub. The at least one rotor blade rotatable in response to wind impinging upon said at least one rotor blade. The at least one rotor blade including a suction side surface and a pressure side surface, and defining a span and a chord. The suction side surface and the pressure side surface defining a blade body extending between a blade tip and a blade root. The blade body including a predetermined breaking point, defined by a reduced strength margin in the blade body, at which a breakaway tip portion may break away from a bulk of the blade body under a predetermined load condition.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In general, the present disclosure is directed to a wind turbine rotor blade that addresses deflection in the rotor blade. The rotor blade comprises a plurality of exterior surfaces defining a blade body having a pressure side, a suction side, a leading edge and a trailing edge. The rotor blade body is configured extending between a blade tip and a blade root. The rotor blade body includes a breakaway tip portion defined by a predetermined breaking point. The breakaway tip portion is configured to break away from the remaining portion of the blade body when subject to a predetermined tower strike load.

Figure 1:
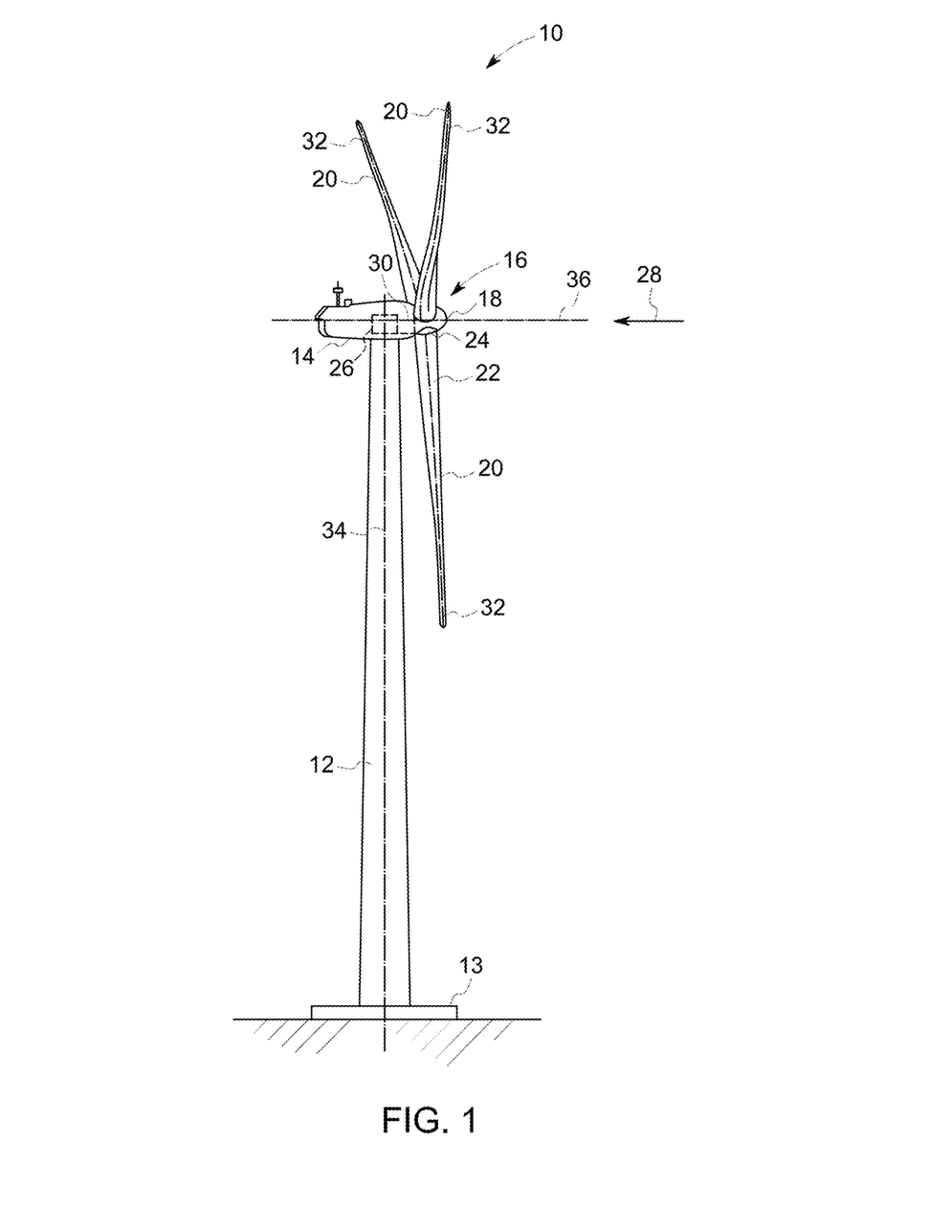
FIG. 1 illustrates a perspective view of one embodiment of a wind turbine, in accordance with one or more embodiments shown or described herein.

Referring now to the drawings, FIG. 1 illustrates a perspective view of one embodiment of a wind turbine 10, according to an embodiment. As shown, the wind turbine 10 is a horizontal-axis wind turbine. However, it should be appreciated that the wind turbine 10 may be a vertical-axis wind turbine. As shown, the wind turbine 10 generally includes a tower 12 that extends from a support system 13, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from an oncoming wind 28 into usable mechanical energy, and subsequently, electrical energy. For instance, the hub 18 may be rotatably coupled to an electric generator (not illustrated) positioned within the nacelle 14 to permit electrical energy to be produced.

Additionally, in the illustrated embodiment, the tower 12 is fabricated from tubular steel to define a cavity (not illustrated) between the support system 13 and the nacelle 16. In an alternative embodiment, the tower 12 may be any suitable type of tower having any suitable height.

The rotor blades 20 may generally have any suitable length that enables the wind turbine 10 to function as described herein. For example, in one embodiment, the rotor blades 20 may have a length ranging from about 15 meters (m) to about 91 m. However, other non-limiting examples of blade lengths may include 10 m or less, 20 m, 37 m or a length that is greater than 91 m. Additionally, the rotor blades 20 may be spaced about the hub 18 to facilitate rotating the rotor 16 to enable kinetic energy to be transferred from the wind 28 into usable mechanical energy, and subsequently, electrical energy. Specifically, the hub 18 may be rotatably coupled to an electric generator (not illustrated) positioned within the nacelle 14 to permit electrical energy to be produced. Further, the rotor blades 20 may be mated to the hub 18 by coupling a blade root portion 22 to the hub 18 at a plurality of load transfer regions 24. Thus, any loads induced to the rotor blades 20 are transferred to the hub 18 via the load transfer regions 24.

As shown in the illustrated embodiment, the wind turbine 10 may also include a turbine control system or turbine controller 26 centralized within the nacelle 16. However, it should be appreciated that the controller 26 may be disposed at any location on or in the wind turbine 10, at any location on the support system 13 or generally at any other location. The controller 26 may be configured to control the various operating modes of the wind turbine 10 (e.g., start-up or shut-down sequences). Additionally, the controller 26 may be configured to control a pitch angle or blade pitch of each of the rotor blades 20 (i.e., an angle that determines a perspective of the rotor blades 20 with respect to the direction of the wind 28) to control the load and power generated by the wind turbine 10 by adjusting an angular position of at least one rotor blade 20 relative to the wind 28. For instance, the controller 26 may control the blade pitch of the rotor blades 20, either individually or simultaneously, by controlling a pitch adjustment system 30. A plurality of pitch axes 32 for the rotor blades 20 are shown. Further, as the direction of the wind 28 changes, the controller 26 may be configured to control a yaw direction of the nacelle 14 about a yaw axis 34 to position the rotor blades 20 with respect to the direction of the wind 28. For example, the controller 26 may control a yaw drive mechanism (not illustrated) of the nacelle 14 in order to rotate the nacelle 14 about the yaw axis 34.

Figure 2:
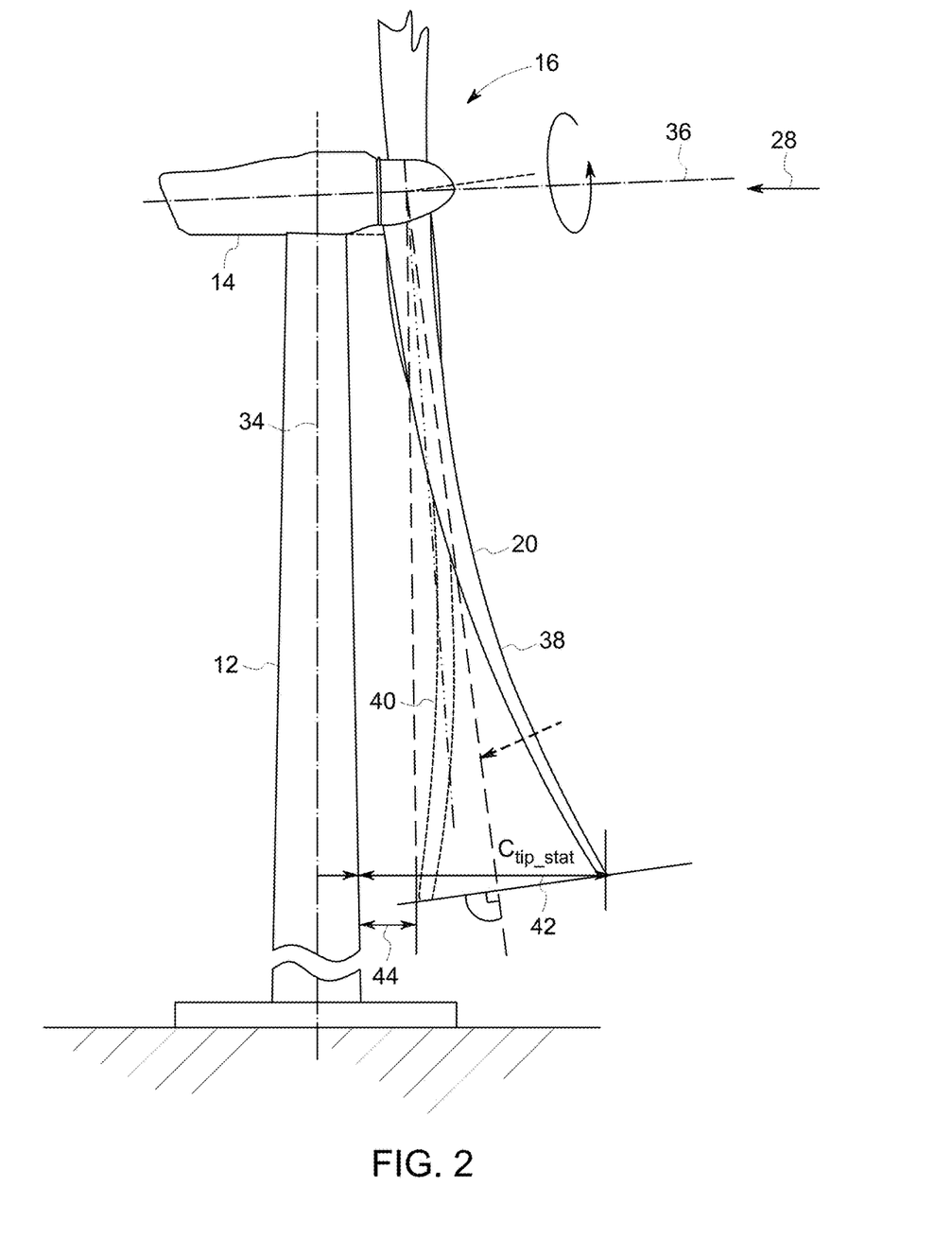
FIG. 2 illustrates a schematic cross-sectional view of a portion of the wind turbine shown in FIG. 1, and more particularly a rotor blade coupled to a wind turbine hub, in accordance with one or more embodiments shown or described herein.

Referring more specifically to FIG. 2, during operation of the wind turbine 10, wind 28 strikes the rotor blades 20 from a direction, which causes the rotor 16 to rotate about an axis of rotation 36. As the rotor blades 20 are rotated and subjected to centrifugal forces, the rotor blades 20 are also subjected to various forces and bending moments. As such, the rotor blades 20 may deflect from a neutral, or non-deflected, position, as indicated at 38, to a deflected position, as indicated at 40. For example, a non-deflected blade clearance distance 42, represents the distance between the rotor blades 20 and the tower 12 when the rotor blades 20 are in the non-deflected position 38. This distance 42 may be referred to as the static tip clearance, $C_{tip\_stat}$. However, forces and bending moments acting on the rotor blades 20 may cause the rotor blades 20 to deflect towards the tower 12, reducing the overall blade clearance, as indicated by deflected blade clearance distance 44. As aerodynamic loads increase, excessive forces and bending moments may cause one or more of the rotor blades 20 to strike the tower 12 resulting in significant damage and downtime.

In an embodiment, the maximum elastic deflection toward the tower 12 shall be determined for the load case using the characteristic loads. The resulting deflection is then multiplied by the combined partial safety factor for loads, material and consequences of failure. The allowable tip deflection depends, as % of the static clearance, on the type of load case $(Y_f)$, on the level of testing $(Y_m)$ and on the consequence of failure $(Y_n)$, where $$Y_f F_k \leq \frac{1}{mn},$$

where $F_k$ is equal to a maximum elastic deflection as % of the static clearance $C_{tip\_star}$, caused by the characteristic loads.

Figure 3:
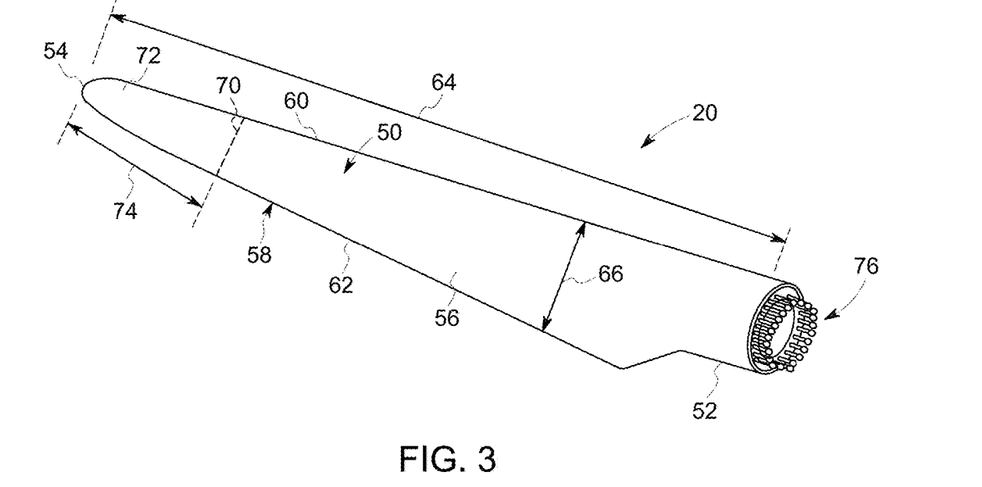
FIG. 3 illustrates a perspective view of one of the rotor blades of the wind turbine shown in FIG. 1, in accordance with one or more embodiments shown or described herein.

Referring now to FIG. 3, a partial cross-sectional view of a portion of the wind turbine shown in FIG. 1, and more particularly a rotor blade 20, is illustrated in accordance with aspects of the disclosure disclosed herein. A plurality of exterior surfaces 48 define a blade body 50 that may extend lengthwise between a blade root 52 and the blade tip 54 and may generally serve as the outer shell of the rotor blade 20. As is generally understood, the blade body 50 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the blade body 50 may generally include a pressure side 56 and a suction side 58 extending between a leading edge 60 and a trailing edge 62. Additionally, the rotor blade 20 may have a span 64 defining the total length of the body 50 between the blade root 52 and the blade tip 54 and a chord 66 defining the total length of the body 50 between the leading edge 60 and the trailing edge 62. As is generally understood, the chord 66 may vary in length with respect to the span 64 as the body 50 extends from the blade root 52 to the blade tip 54.

As previously described, with the desire to increase blade length for improved energy output, the deflection of the rotor blade 20 presents as an issue. Longer rotor blades may be subject to increased deflection forces, increasing the risk of the rotor blade striking the tower. As described herein, in an effort to address deflection in the rotor blade, the rotor blade 20 includes a portion that may be broken off during an impact event of the rotor blade 20 with the tower 12 due to blade deflection. More particularly, as illustrated, in an embodiment the rotor blade 20, and in particular the blade body 50, includes a predetermined breaking point, indicated by dashed line 70, at which a breakaway tip portion 72, having a breakaway tip length 74, of the rotor blade 20 may break away from the bulk of the rotor blade 20 under a predetermined load condition. This breaking away of the breakaway tip portion 72 upon sufficient deflection to cause the rotor blade 20 to impact the tower 12 results in minimal, if any, damage to the tower 12. During design of the wind turbine 10, the tower strike loads may be included into the design loads. Subsequent to impact of the rotor blade 20 with the tower 12, and resulting breaking away of the breakaway tip portion 72, the breakaway may be detected and the wind turbine 10 can do an emergency stop. As a next step, the breakaway tip portion 72 may be collected and a new rotor blade 20, and in many instances, only a new tip portion, may be provided as replacement. In various disclosed embodiments, as described below with regard to FIGS. 4-10, the breaking away of the breakaway tip portion 72 may be accomplished by several different means. It should be noted that the disclosed breaking away of a portion of the rotor blade 20, and more particularly the breakaway tip portion 72, may be applicable to both modular and one-piece rotor blade construction.

As shown, the rotor blade 20 may further include a plurality of root attachment assemblies 76 for coupling the blade root 20 to the hub 18 of the wind turbine 10. In general, each root attachment assembly 76 may include a barrel nut and bolt assembly. Alternatively, the rotor blade 20 may be coupled to a hub extension, or utilize alternative coupling means such as, but not limited to, press fit, wedge, and/or a combinations of known coupling means.

One or more specific embodiments of the technique for achieving breaking away of the breakaway tip portion 72, as a result of rotor blade deflection and impact with the tower 12 will be described below. In an effort to provide a concise description of these embodiments, not all features of an actual implementation are described in the specification. Referring more specifically to FIGS. 4-10, illustrated are various embodiments of a breakaway tip portion configuration in relation to a wind rotor blade. For the sake of simplicity, only a portion of the wind turbine 10, and in particular, a portion of the rotor blade 20 is shown in FIGS. 4-10. In addition, it should be noted that identical reference numerals denote the same elements throughout the various views. It should be appreciated that the breakaway configuration(s) shown in FIGS. 4-10 may be utilized with any other suitable wind rotor blade structure.

Figure 4:
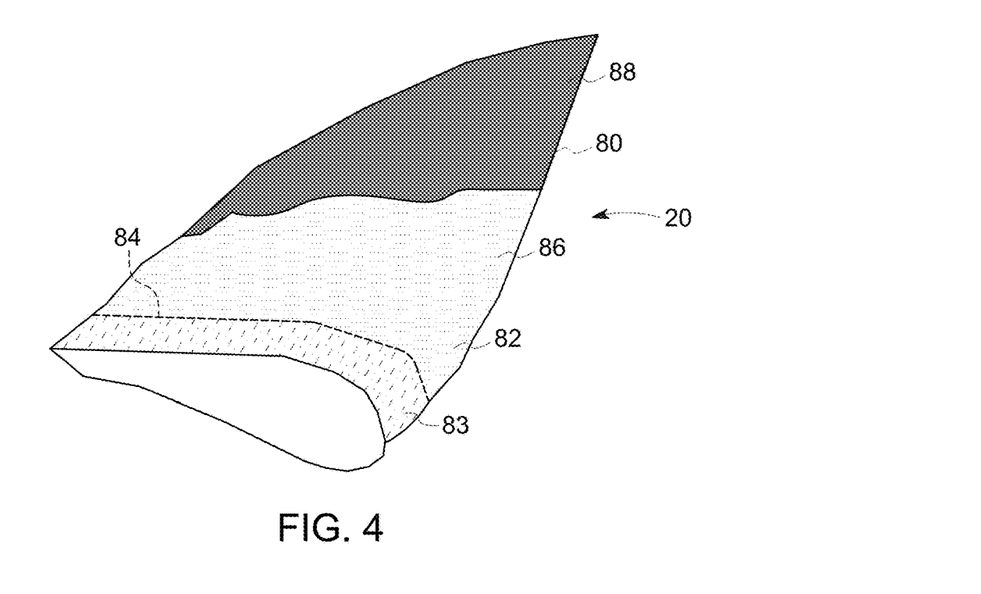
FIG. 4 illustrates a schematic perspective view of a tip portion of the wind rotor blade body according to an embodiment, in accordance with one or more embodiments shown or described herein.

Referring now to FIG. 4, illustrated is a first embodiment of a breakaway tip portion 80, generally similar to breakaway tip portion 72 of FIG. 3. In this particular embodiment, the breakaway tip portion 80 is formed of a material 82 having a reduced strength margin when compared to the material 83 forming the bulk of the rotor blade 20. The material 82 that forms the breakaway tip portion 80 upon impact with the tower 12 provides for breaking away of the breakaway tip portion 82 at a predetermined breaking point 84. The material 82 is an impact load limiting material type, such as comprised of a solid core 86 having a minor surface structure 88 or skin, enclosing the solid core 86. The material 82 is configured for predetermined impact loading, up to such point where the load impact causes the material to fail and breakaway, such as when impacting a tower 12. See for example, PCT Patent Application No. PCT/US2016/02445, Thomas Merzhaeuser et al., "ROTOR BLADE TIP MOLD ASSEMBLY INCLUDING SOLID CORE AND METHOD FOR FORMING ROTOR BLADE TIP", and PCT Patent Application No. PCT/US2016/02447, Thomas Merzhaeuser et al., "ROTOR BLADE TIP MOLD ASSEMBLY INCLUDING EXPANDABLE BLADDERS AND METHOD FOR FORMING ROTOR BLADE TIP", which are both incorporated by reference herein in its entirety.

Figure 5:
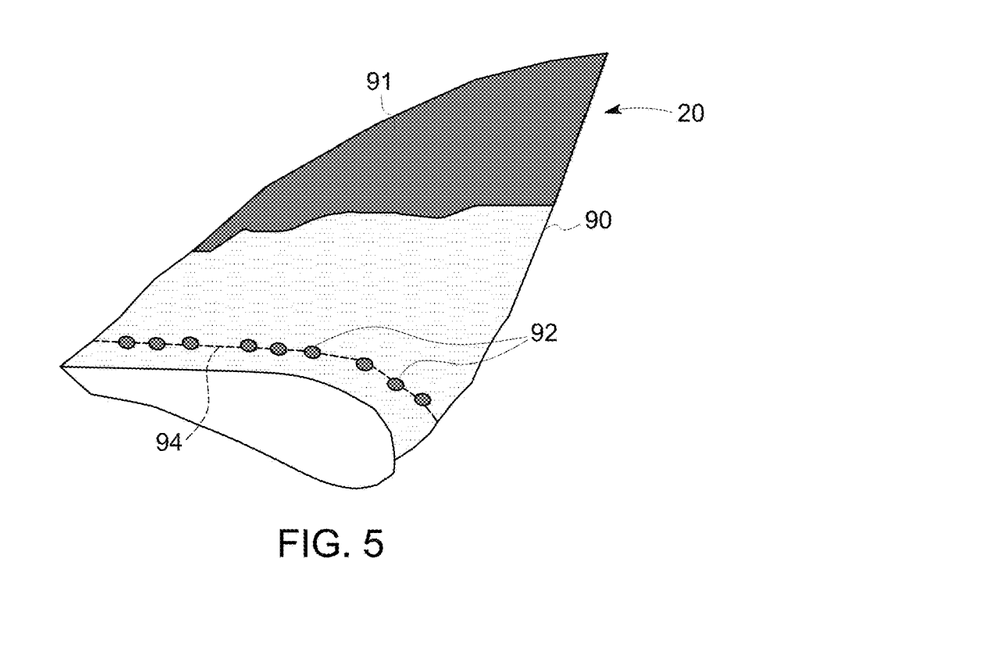
FIG. 5 illustrates a schematic perspective view of a tip portion of a wind rotor blade body according to another embodiment, in accordance with one or more embodiments shown or described herein.

Referring now to FIG. 5, illustrated is another embodiment of a breakaway tip portion 90, generally similar to breakaway tip portion 72 of FIG. 3. As illustrated, an exterior skin or covering 91 is shown as partially removed to reveal a plurality of perforations (described presently). In this particular embodiment, the breakaway tip portion 90 is defined by a plurality of perforations 92. More particularly, the rotor blade 20 (FIG. 3) includes the plurality of perforations 92 to provide a predetermined breaking point, indicated by dashed line 94. The plurality of perforations 92 are configured to extend substantially through the complete rotor blade structure or only partially through the rotor blade structure. In a preferred embodiment, the perforations do not extend through an exterior skin, so as to provide a weakening of the rotor blade structure and thus allow for breaking away of the breakaway tip portion 90 at the predetermined breaking point 94 during deflection of the rotor blade 20 and impact with the tower 12. The illustrated perforations 92 of FIG. 5 are configured as substantially spherical openings, spaced a distance one from another. It is anticipated in alternate embodiments, that any shape, number and spacing of perforations may be provided, as well as depth to which the perforations are formed in the blade structure, dependent upon blade material and calculated load at time of impact.

Figure 6:
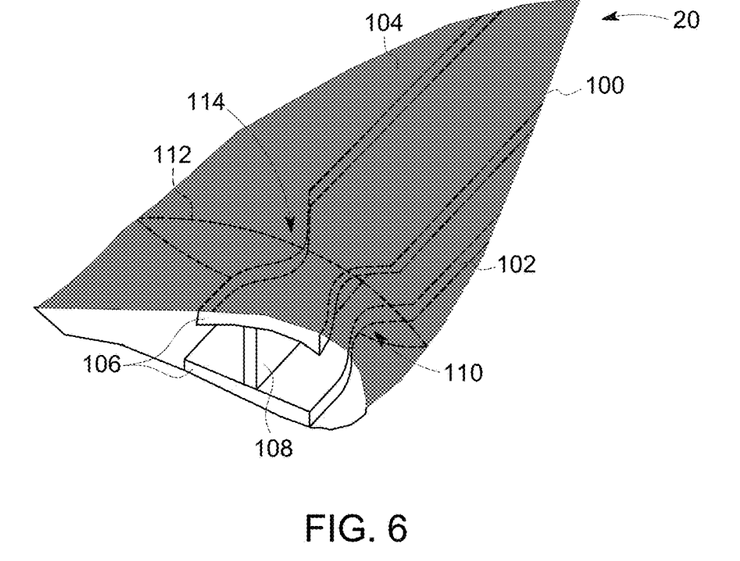
FIG. 6 illustrates a schematic perspective view of a tip portion of a wind rotor blade body according to another embodiment, in accordance with one or more embodiments shown or described herein.

Referring now to FIG. 6, illustrated is another embodiment of a breakaway tip portion 100, generally similar to breakaway tip portion 72 of FIG. 3. In this particular embodiment, the breakaway tip portion 100 includes a load carrying component in which the geometry is modified to provide for breaking away of the breakaway tip portion 72. More particularly, in this particular embodiment the breakaway tip portion 100 includes an internal load carrying structural component 102 (as illustrated in dashed line) disposed within an external structure 104, such as a skin, or the like. In an embodiment, the internal load carrying structural component 102, as illustrated in FIG. 6, may be comprised of a plurality of spar caps 106 and an associated web 108 provided internally of the rotor blade 20. As shown, the spar cap 106 includes a narrowing at a point along a length of the load carrying structural component 102 so as to define a narrowed portion 110 of the load carrying structural component 102. This narrowed portion 110 of load carrying structural component 102, and thus a weakening in the load carrying structural component 102, provides a predetermined breaking point 112 for the breakaway tip portion 100. The illustrated narrowed portion 110 of the load carrying structural component 102 of FIG. 6 is configured as substantially symmetrical indentions 114 of the plurality of spar caps 106. It is anticipated in alternate embodiments, that an alternate geometry may provide for a weakening in the load carrying structural component 102, including non-symmetrical indentions, perforations, or the like, dependent upon blade material, internal structure material and configuration, along with a calculated load at time of impact.

Figure 7:
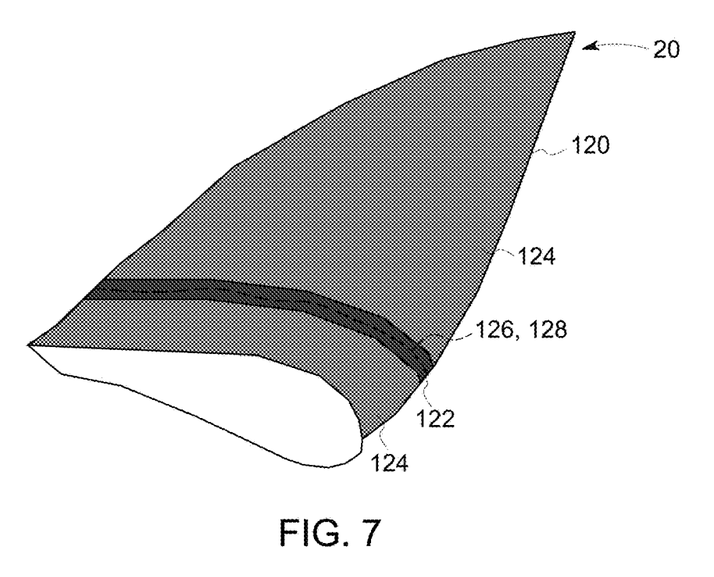
FIG. 7 illustrates a schematic perspective view of a tip portion of a wind rotor blade body according to another embodiment, in accordance with one or more embodiments shown or described herein.

Referring now to FIG. 7, illustrated is another embodiment of a breakaway tip portion 120, generally similar to breakaway tip portion 72 of FIG. 3. In this particular embodiment, the breakaway tip portion 120 is formed so as to include a differing material from that forming the bulk of the rotor blade 20, to define a predetermined breaking point 122. More particularly, the material forming the predetermined breaking point 122 includes a reduced strength margin, such as with respect to the number of material plies, or the like, from that forming the bulk of the rotor blade 20, to define the predetermined breaking point 122. As an example, in an embodiment, the overall rotor blade 20 structure may be formed of a defined number of material plies, referenced 124 and a portion 126 of the rotor blade 20 is comprised of material plies 128 that differ from the material plies 124 of the overall rotor blade 20 so as to define the predetermined breaking point 122. In an embodiment, the portion 126 of the rotor blade is comprised of a lesser number of material plies than that of the overall rotor blade 20 so as to form a weakening at that particular point in the blade structure. This weakening in the blade structure corresponds to the predetermined breaking point 122 for the breakaway tip portion 120. In alternate embodiments, the portion 126 of the rotor blade 20 that defines the predetermined breaking point 122 may be comprised of thinner material plies than that of the remaining portion of the rotor blade 20 or comprise other properties that provide a reduced strength margin and would define the predetermined breaking point 122, such as, but not limited to, weaker material choices, or the like.

Figure 8:
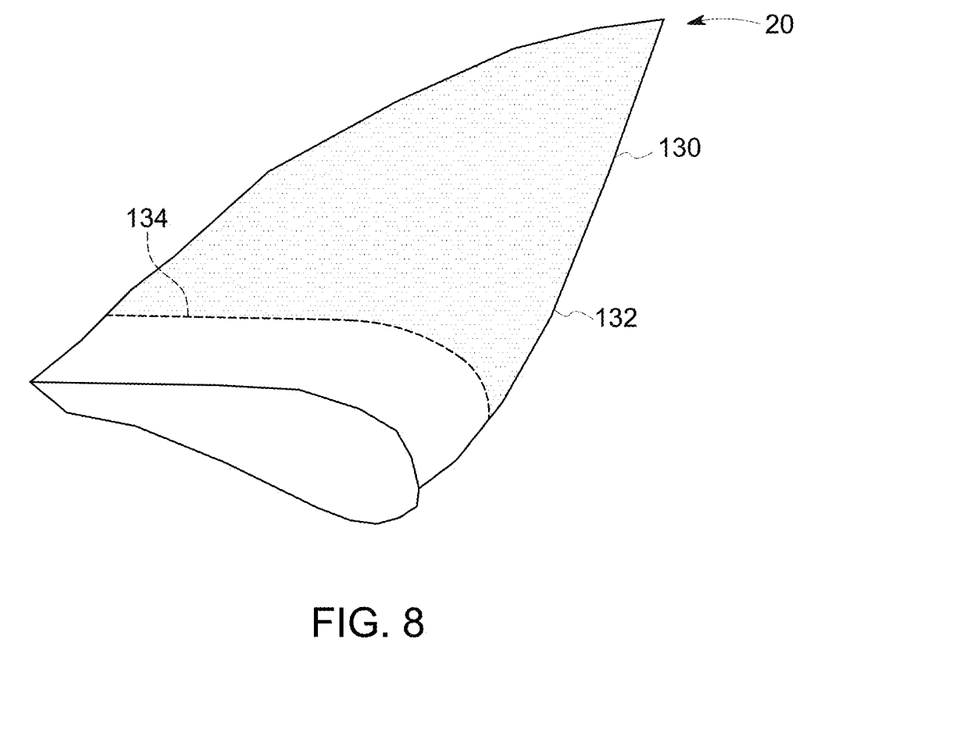
FIG. 8 illustrates a schematic perspective view of a tip portion of a wind rotor blade body according to another embodiment, in accordance with one or more embodiments shown or described herein.

Referring now to FIG. 8, illustrated is another embodiment of a breakaway tip portion 130, generally similar to breakaway tip portion 72 of FIG. 3. In this particular embodiment, the breakaway tip portion 130 is formed of a material 132 that upon impact of the rotor blade 20 with the tower 12, results in shattering of the material 132, along a predetermined breaking point 134, forming the breakaway tip portion 130.

Figure 9:
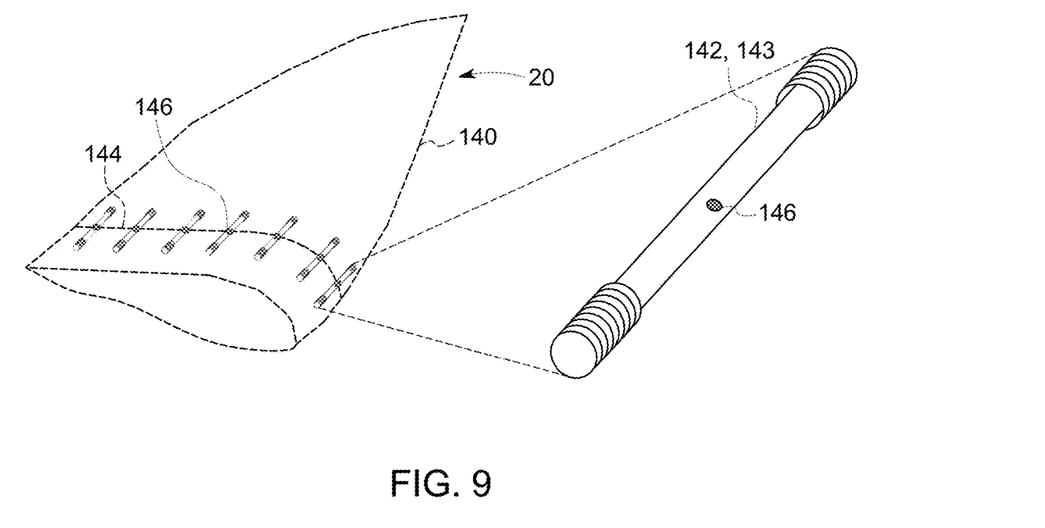
FIG. 9 illustrates a schematic perspective view of a load carrying structural component for use in a wind rotor blade according to another embodiment, in accordance with one or more embodiments shown or described herein.
Figure 10:
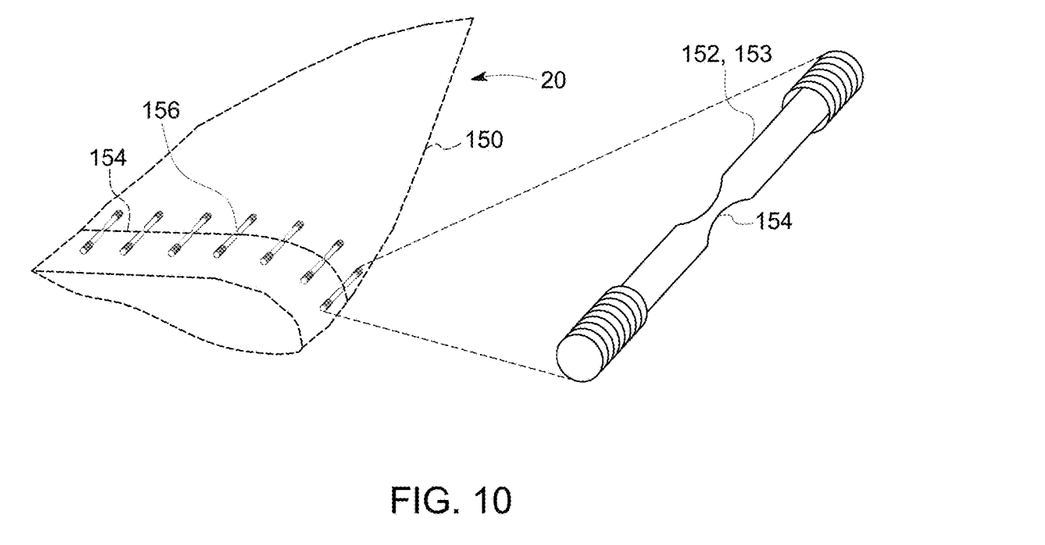
FIG. 10 illustrates a schematic perspective view of a load carrying structural component for use in a wind rotor blade according to another embodiment, in accordance with one or more embodiments shown or described herein.

Referring now to FIGS. 9 and 10, illustrated are embodiments of a breakaway blade structure that may be included within a tip portion of a rotor blade 20 as disclosed herein. More particularly, illustrated in FIGS. 9 and 10 break away blade tip portions 140, 150, respectively, (as shown by the phantom lines), and generally similar to breakaway tip portion 72 of FIG. 3. The breakaway tip portions 140, 150, include a plurality of internal blade support structures, and more particularly a plurality of load carrying structural components 142, 152, respectively. The internal load carrying structural components 142, 152 are generally configured for disposing within at least a portion of the rotor blade 20 so as to provide structural support thereto. In the embodiment of FIG. 9, the load carrying structural components 142 are disposed in the rotor blade 20, and more particularly at least partially within the breakaway blade tip portion 140. In an embodiment, each of the plurality of load carrying structural components 142 is configured as a bolt 143. To define a predetermined breaking point 144, as best illustrated in the enlargement of a single load carrying structural component 142, a void 146 may be formed therein in one or more of the load carrying structural components 142. The perforation 146 is formed in load carrying structural component 142 to define a weakened strength margin at that particular point within the rotor blade 20. This defined weakening of the load carrying structural component 142 provides for breaking away of the breakaway tip portion 142 during impact of the rotor blade 20 with the tower 12 (FIG. 1) along the predetermined breaking point 144.

In another embodiment, as best illustrated in FIG. 10, the plurality of load carrying structural components 152 are disposed in the rotor blade 20, and more particularly at least partially within a breakaway blade tip portion 152 (as shown by the phantom lines), generally similar to breakaway tip portion 72 of FIG. 3. Similar to the embodiment of FIG. 10, each of the plurality of load carrying structural components 152 is configured as a bolt 153 and may include a narrowing of the geometry of the structure, generally referenced 156, to define a reduced strength margin and thus weakening in the load carrying structural component 152 at a predetermined breaking point 154. Similar to the embodiment of FIG. 9, the narrowing of the load carrying structural component 152 defines a weakened area within the rotor blade 20, thus providing for breaking away of the breakaway tip portion 152 during impact of the rotor blade 20 with the tower 12 (FIG. 1) along the predetermined breaking point 154.

The extent or magnitude of blade deflection required before the rotor blade 20 impacts the tower 12 (FIG. 1) may vary from wind turbine to wind turbine. For example, the predetermined blade deflection threshold may depend on the operating conditions of the wind turbine 10, the thickness of the rotor blades 20, the length of the rotor blades 20 and numerous other factors.

Accordingly, disclosed is a rotor blade that addresses deflection in rotor blades and subsequent impact with a wind turbine tower. The rotor blade as described is equipped with a predetermined breaking point that leads to a designed, local failure of the rotor blade structure without overloading the remaining portion of the rotor blade. The inclusion of a breakaway tip portion provides that damage to the rotor blades is limited to the tip of the rotor blade. In an embodiment, the tower may be reinforced to tolerate the impact of the rotor blade with the tower with limited energy. In an embodiment, the predetermined blade breaking point may be located at a joint location of a modular blade. The introduction of a predetermined breaking point for wind turbine rotor blades enables the cost of a tower strike to be predictable. Furthermore new turbine operating modes might be considered, rating the risk of a tower strike vs. the benefit of running the turbine at higher loads to push the maximum power output for a period of time.

It is to be understood that not necessarily all such objects or advantages described above may be achieved in accordance with any particular embodiment. Thus, for example, those skilled in the art will recognize that the disclosed embodiments and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, various features described, as well as other known equivalents for each feature, may be mixed and matched by one of ordinary skill in this art to construct additional embodiments and techniques in accordance with principles of this disclosure.

It should be appreciated that the present subject matter encompasses a wind turbine. The wind turbine 10 includes a tower 12 and a nacelle 14 mounted atop the tower 12. The wind turbine 10 also includes a rotor 16 coupled to the nacelle 14 that comprises a hub 18 and at least one rotor blade 20 extending outwardly from the hub 18. The wind turbine rotor blade 20 includes a breakaway tip portion which may be configured, adapted or designed as described herein.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wind turbine rotor blade comprising:
 a plurality of exterior surfaces defining a blade body having a pressure side, a suction side, a leading edge and a trailing edge, the blade body extending between a blade tip and a blade root, the rotor blade defining a span and a chord, and
 the blade body including a breakaway tip portion and a predetermined breaking point, the predetermined breaking point defined by a banding of material having a reduced strength margin from that of a material forming a remainder of the blade body,
 wherein the breakaway tip portion is configured to break away at the predetermined breaking point upon deflection of the blade body resulting in an impact of the breakaway tip portion with a tower.

2. A wind turbine rotor blade as claimed in claim 1, wherein the blade body is comprised of a number of material plies, and wherein the predetermined breaking point is defined by an area comprised of a lesser number of material plies than the number of material plies defining the remaining portion of the blade body.

3. A wind turbine rotor blade as claimed in claim 1, wherein the breakaway tip portion is comprised of a material configured for shattering when subject to deflection of the blade body resulting in the impact of the breakaway tip portion with the tower.

4. A wind turbine rotor blade as claimed in claim 1, wherein the breakaway tip portion is comprised of an impact load limiting material configured to break away when subject to deflection of the blade body resulting in the impact of the breakaway tip portion with the tower.

5. A wind turbine rotor blade as claimed in claim 1, wherein the breakaway tip portion comprises a load carrying structural component including a weakened portion at the predetermined breaking point to provide breaking away of the breakaway tip portion when subject to deflection of the blade body resulting in the impact of the breakaway tip portion with the tower.

6. A wind turbine rotor blade as claimed in claim 5, wherein the load carrying structural component comprises at least one of a spar cap or a web.

7. A wind turbine rotor blade as claimed in claim 5, wherein the load carrying structural component comprises a bolt.

8. A wind turbine rotor blade as claimed in claim 5, wherein the weakened portion at a predetermined breaking point is defined by one or more perforations formed in the load carrying structural component.

9. A wind turbine rotor blade as claimed in claim 5, wherein the weakened portion at a predetermined breaking point is defined by a narrowing in geometry of the load carrying structural component.

10. A wind turbine rotor blade as claimed in claim 1, wherein the predetermined breaking point is defined by a weakened material.

11. A wind turbine rotor blades as claimed in claim 10, wherein the weakened material includes fewer material plies than the remaining portion of the rotor blade.

12. A wind turbine rotor blade as claimed in claim 1, wherein the predetermined breaking point is defined by one or more perforations formed through at least a portion of the rotor blade structure.

13. A wind turbine rotor blade as claimed in claim 1, wherein the rotor blade is a jointed blade.

14. A wind turbine, the wind turbine comprising a plurality of rotor blade assemblies, at least one of the rotor blade assemblies comprising:
- a suction side surface and a pressure side surface, and defining a span and a chord, the suction side surface and the pressure side surface defining a blade body extending between a blade tip and a blade root,
- the blade body including a breakaway tip portion and a predetermined breaking point defining a point at which the breakaway tip portion may break away, the predetermined breaking point defined by a banding of material having a reduced strength margin from that of a material forming the blade tip and a remaining portion of the blade body,
- wherein the breakaway tip portion is configured to break away at the predetermined breaking point upon deflection of the blade body resulting in an impact of the breakaway tip portion with a tower.

15. A wind turbine claimed in claim 14, wherein the breakaway tip portion is comprised of an impact load limiting material configured to break away when subject to deflection of the blade body resulting in the impact of the breakaway tip portion with the tower.

16. A wind turbine as claimed in claim 14, wherein the breakaway tip portion comprises a load carrying structural component, including a weakened portion at the predetermined breaking point, configured to breakaway when subject to deflection of the blade body resulting in the impact of the breakaway tip portion with the tower.

17. A wind turbine as claimed in claim 16, wherein the weakened portion at the predetermined breaking point is defined by at least one of one or more perforations in the load carrying structural component or a narrowing in geometry of the load carrying structural component.

18. A wind turbine as claimed in claim 14, wherein the predetermined breaking point is defined by a weakened material.

19. A wind turbine as claimed in claim 14, wherein the predetermined breaking point is defined by one or more perforations formed through at least a portion of the rotor blade body.

20. A wind turbine comprising:
- a tower;
- a hub; and
- at least one rotor blade rotatably connected to the hub, the at least one rotor blade rotatable in response to wind impinging upon the at least one rotor blade, the rotor blade comprising:
  - a suction side surface and a pressure side surface, and defining a span and a chord, the suction side surface and the pressure side surface defining a blade body extending between a blade tip and a blade root,
  - the blade body including a breakaway tip portion and a predetermined breaking point defined by a banding of material having a reduced strength margin from that of a material forming a remainder of the blade body, wherein the breakaway tip portion is configured to break away at the predetermined breaking point upon deflection of the blade body resulting in an impact of the breakaway tip portion with the tower.

21. A wind turbine claimed in claim 20, wherein the breakaway tip portion is comprised of one of an impact load limiting material configured to break away when subject to the predetermined load condition or a load carrying structural component including a weakened portion at the predetermined breaking point to provide for breaking away of the breakaway tip portion when subject to deflection of the blade body resulting in the impact of the breakaway tip portion with the tower.

22. A wind turbine as claimed in claim 20, wherein the predetermined breaking point is defined by one of a weakened material portion or one or more perforations formed through at least a portion of the rotor blade body.

* * * * *